United States Patent [19]
Whitley, Jr.

[11] 3,883,159
[45] May 13, 1975

[54] AUXILIARY ROLLER WHEEL DEVICE FOR IMMERSIBLE BOAT TRAILERS

[76] Inventor: William P. Whitley, Jr., 4525 E. 10th Ln., Hialeah, Fla. 33013

[22] Filed: Feb. 16, 1973

[21] Appl. No.: 333,208

[52] U.S. Cl............................ 280/414 R; 280/150.5
[51] Int. Cl............................................... B60p 3/10
[58] Field of Search ......... 280/414, 475, 476, 150.5

[56] References Cited
UNITED STATES PATENTS

| | | | |
|---|---|---|---|
| 1,779,887 | 10/1930 | Melanson | 280/414 R X |
| 2,168,440 | 8/1939 | Dole | 188/5 |
| 2,856,087 | 10/1958 | Steber | 280/414 R X |
| 3,170,708 | 2/1965 | Miller | 280/150.5 X |
| 3,190,674 | 6/1965 | Carter | 280/414 R X |
| 3,463,505 | 10/1969 | German et al. | 280/79.2 |

FOREIGN PATENTS OR APPLICATIONS

| 842,929 | 7/1960 | United Kingdom | 280/150.5 |
|---|---|---|---|

Primary Examiner—Leo Friaglia
Assistant Examiner—Randall Schrecengost
Attorney, Agent, or Firm—Ernest H. Schmidt

[57] ABSTRACT

An auxiliary roller wheel device removably attachable in pairs to the framework, one at each side, of an immersible boat trailer between the bogie wheels thereof and the hitch end to prevent dropping of the bogie wheels into deep water behind the ledge or into a depression in the underwater terrain near the shore while the trailer is being backed into the water for launching or loading a boat. Each roller wheel device is provided with slot means for receiving a web or flange portion of framework I-beam members comprising the supporting structure of an immersible trailer and means for clamping the roller wheel members in adjusted position along such I-beam members.

2 Claims, 4 Drawing Figures

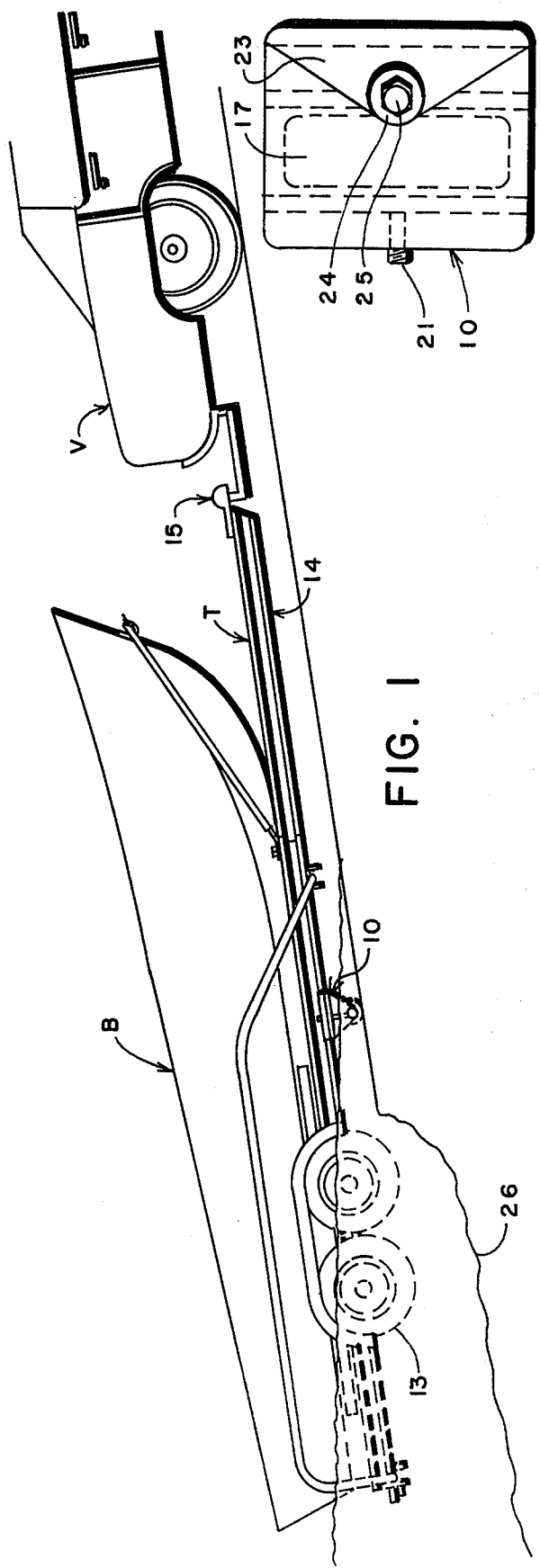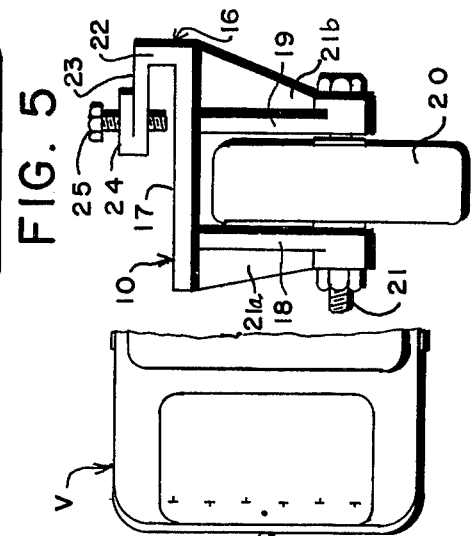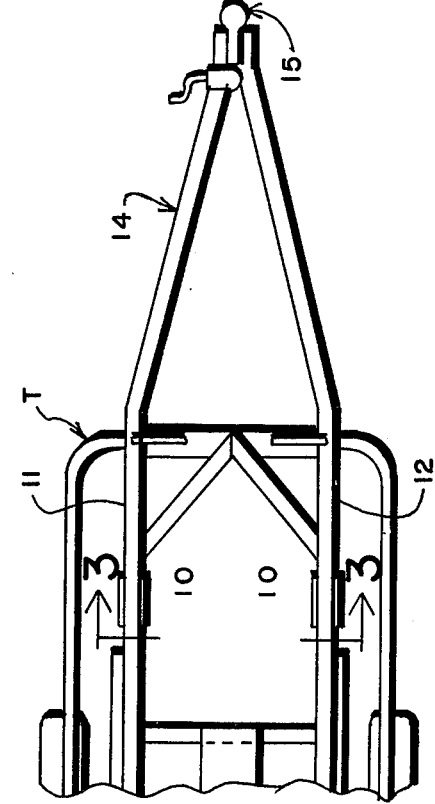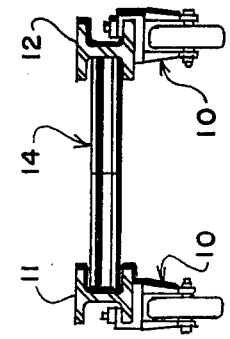

AUXILIARY ROLLER WHEEL DEVICE FOR IMMERSIBLE BOAT TRAILERS

This invention relates to immersible boat trailers and is directed particularly to an auxiliary roller wheel device adjustably attachable along the trailer framework between the bogie wheels and the hitch end of the trailer to provide rolling support for the trailer when the trailer is backed into the water and off a steep underwater incline or ledge offering no support for the trailer wheels during launching or loading of a trailered boat.

In my U.S. Pat. No. 3,632,138, issued Jan. 4, 1972, I describe an immersible boat trailer with a boat cradling framework comprising a pair of spaced, parallel, longitudinally-extending I-beam members which, at their forward end, converge inwardly to provide a tongue including means for hitching to a trailering vehicle. A wheeled bogie unit secured to the undersides of the framework I-beam members, near the rear ends thereof, provides the main support for the boat being trailered, the tongue end of the framework being supported in raised position by the vehicle to which the trailer is hitched. If, in backing the trailer into the water for floating off or floating on a trailered boat, the underwater terrain falls off sharply, leaving no support for the trailer bogie wheels, the trailer frame may drop to such an extent as to make it difficult, if not impossible, to rollingly pull the trailer out of the water. The present invention is directed to auxiliary roller wheel devices that can readily be attached, one at each side of the trailer along the I-beam members at positions behind the wheeled bogie unit, to prevent the bogie wheels falling behind a sheer or substantially sheer underwater ledge surface, and thereby enabling the trailer to be withdrawn from the water first by the rolling support afforded by the auxiliary roller wheels and then by the bogie unit as its wheels are carried over the top surface of the ledge.

It is, accordingly, the principal object of this invention to provide an auxiliary roller wheel device for immersible boat trailers of the character herein described that can readily be attached to the underside of the trailer framework, at each side thereof, and between the wheels of the trailer and the hitch end or tongue to provide rolling support for the trailer during float-on and float-off operations wherein the terrain under the water at the shore falls off to such a sharp degree as would otherwise hookingly engage the main trailer wheels and thereby prevent normal rolling withdrawal of the trailer by the pulling vehicle.

Another object of the invention is to provide an auxiliary roller wheel device of the above nature which is readily adjustably securable along the underside of the trailer framework to provide for positioning therealong to best suit the conditions of the underwater terrain along which the trailer is being rolled for boat launching or loading purposes.

Another object of the invention is to provide a roller wheel device of the character described having a framework which can readily be integrally fabricated of cast metal as a unitary member comprising means for both journalling a roller wheel and for attachment in adjusted position along a trailer framework I-beam member.

Another object of the invention is to provide a roller wheel device for immersible boat trailers which will be simple in construction, economical to manufacture, easy to use, compact, dependable in operation and durable in use.

Other objects, features and advantages of the invention will be apparent from the following description when read with reference to the accompanying drawings. In the drawings, wherein like reference numerals denote corresponding parts throughout the several views:

FIG. 1 is a side elevational view of a boat trailer carrying a boat and equipped with auxiliary wheels embodying the invention;

FIG. 2 is a partial view of the boat trailer, shown separately and as viewed from above to illustrate the positioning therealong of auxiliary wheel devices at each side of the trailer;

FIG. 3 is a transverse cross-sectional view taken along the line 3—3 of FIG. 2, in the direction of the arrows and illustrating details of the auxiliary wheel devices;

FIG. 4 is a rear elevational view of the auxiliary wheel device, shown separately and on enlarged scale to illustrate mechanical details; and FIG. 5 is a top view of the auxiliary wheel device illustrated in FIG. 4.

Referring now in detail to the drawings, reference numeral 10 designates, generally, one of the auxiliary wheel devices embodying the invention, the same being illustrated in FIGS. 1 and 2 in their positions of use on a boat trailer T of the type, for example, illustrated and described in my above-mentioned U.S. Pat. No. 3,632,138.

As best illustrated in FIGS. 2 and 3, the supporting framework of the immersible boat trailer T comprises front to back, spaced, parallel I-beam members 11, 12, which, near the rear ends thereof, support a wheeled bogie 13 providing the main rolling support for a trailered boat B, and which at the front ends thereof converge to provide a tongue 14. The forward end of the tongue 14 is equipped with the usual hitch connector member 15 for attachment to the trailer hitch mechanism of an automotive vehicle V.

Referring to FIGS. 4 and 5 of the drawings, the auxiliary roller wheel device 10 comprises a body member 16, which is preferably integrally formed as by casting of a non-ferrous metal, said body member comprising a substantially rectangular base plate 17 from the underside of which project downwardly a pair of spaced, parallel trunnion plates 18, 19 journalling between them a wheel 20 on an axle bolt 21 extending laterally through said trunnion plates. Central, vertical ribs 21a, 21b join underside portions of the face plate 17 with outside portions of the trunnion plates 18, 19, respectively to strengthen the supporting structure for the wheel 20. The face plate member 17 along one side is provided with a short, upstanding wall portion 22 the upper end of which merges into an equilateral triangular top plate portion 23 disposed in spaced, parallel relation with respect to said face plate member. The apex of top plate portion 23 is somewhat rounded, and further formed with an upstanding, conforming circular boss portion 24. The circular boss portion 24 is centrally drilled and tapped through the top plate portion 23 to threadingly receive a machine bolt 25 provided for removably securing the assembly in adjusted position along one of the I-beam members 11, 12 of an immersible boat trailer T, as is hereinbelow more particularly described.

FIG. 1 illustrates the use of a pair of auxiliary wheel devices 10 attached to the underside of a trailer framework between the bogie wheels and the trailer hitch to prevent drop-off of the main trailer wheels under the water under conditions where the underwater terrain drops off sharply a short distance from the shore line, as indicated at 26 of FIG. 1. Under such conditions which may be aggravated at low tide in order to launch or load the boat being trailered, support for the bogie wheels is lost and they will settle at a position beyond the ledge of the underwater terrain. The main wheels thus often become caught or hooked against the vertical face of the ledge, particularly if it takes a sharp drop, making it very difficult to pull the trailer from the water after launch or loading of the boat to be trailered has been completed. The auxiliary roller wheel devices, when fixed to the underside of a trailer framework between the bogie wheels and the trailer hitch as illustrated in FIGS. 1 and 2, are of such vertical depth as to prevent settling of the bogie or main wheels 13 by more than a few inches after they have passed beyond an underwater ledge or depression, thereby enabling the trailer to be withdrawn again without difficulty.

As illustrated in FIG. 4, the spacing between the underside of the top plate portion 23 and the face plate 17 of the roller wheel device body member 16 is such as to snugly receive outer portions of the lower webs of the trailer I-beam members 11, 12, wherealong they can be securely clamped simply by screwing down the machine bolts 25 with a suitable wrench.

If the underwater ledge or drop-off happens to be very close to the shore line, the auxiliary wheel devices 10 can be moved closer to the hitch end of the trailer, thereby providing a greater distance between them and the main or bogie wheel 13. Preferably, the auxiliary roller wheel devices 10 will be fabricated of a strong lightweight material such as of an aluminum alloy to facilitate installation, removal and storage when not in use.

While I have illustrated and described herein only one form in which the invention can conveniently be embodied in practice, this embodiment is presented by way of example only and not in a limiting sense. The invention, in brief, comprises all the embodiments and modifications coming within the scope and spirit of the following claims.

What I claim as new and desire to secure by Letters patent is:

1. An auxiliary roller wheel device for boat trailers and the like comprising, in combination, a body member, said body member comprising a substantially rectangular base plate, a pair of spaced, parallel trunnion members extending outwardly of one side of said base plate, a wheel, means journalling said wheel between said trunnion members, the other side of said base plate comprising means for removably securing said base plate against the underside of a trailer framework I-beam member, said base plate securing means comprising an upstanding wall portion extending outwardly of the other side of said base plate and along one edge thereof, said upstanding wall portion merging, at its outer end, with a top plate portion in spaced, parallel relation with respect to said base plate and defining therewith an open-ended slot, means for clamping said body member to a trailer framework I-beam member web portion received in said slot, said top plate portion being in the form of an equilateral triangle the apex of which extends outwardly of said short, upstanding wall portion for a distance of somewhat less than one-half the transverse width of said base plate, said clamping means comprising a screw member threadingly received in a threaded opening through said apex portion of said top plate portion, said body member being integrally formed with said base plate, said trunnion members, said upstaning wall portion and said top plate portion, said trunnion members each being integrally formed along their outsides with central, vertically-extending reinforcing rib portions merging at their upper ends into opposed portions of said one side of said base plate.

2. An auxiliary roller wheel device as defined in claim 1 wherein said apex portion of said top plate portion is integrally formed with an outwardly-extending, circular boss.

* * * * *